Patented Mar. 26, 1940

2,194,526

UNITED STATES PATENT OFFICE 2,194,526

PAINT

Robert Pfanstiel, Lakewood, Ohio, assignor to E. I. du Pont de Nemours & Company, Wilmington, Del., a corporation of Delaware No Drawing. Application June 10, 1937, Serial No. 147,482

4 Claims. (Cl. 134—39)

This invention relates to paints, and is particularly directed to drying oil vehicle paints containing basic lead sulfates having a $PbO:PbSO_4$ ratio no lower than about 2:1.

In addition to a pigment and a vehicle, a paint may contain various addition agents which are useful in altering or controlling the properties of the paint. For example, when basic lead compounds are used in paints containing a drying oil vehicle, a reaction occurs between the oil and the basic lead, resulting in the formation of lead soaps.

Formation of lead-oil soaps in a paint is accompanied by changes in certain properties of the paint. The consistency is increased. The film formed by the paint shows decreased permeability to water, decreased rate of destructive oxidation, and greater elasticity. The result of these improvements in properties is an increase in durability of the paint film.

The widespread use of certain basic lead compounds in paints came about because of their excellent pigment properties, without recognition of any connection between these properties and chemical compositions. The pigment value of such materials as basic carbonate white lead has been universally recognized for centuries.

As sources of basic lead in paints, the commonly used basic lead pigments are subject to certain objections. In basic carbonate white lead, $2PbCO_3 \cdot Pb(OH)_2$, the basic lead is present as the hydroxide and is not particularly reactive with the oils of the paint vehicle. Basic lead in the form of litharge, PbO, is too reactive with drying oils. Moreover, the use of litharge is limited by its color. Red lead, $Pb_3O_4$, is subject to the same objections as is litharge in respect to color.

In the basic lead sulfates, which have heretofore been used as paint pigments in the form of sublimed white lead and as a constituent of leaded zinc oxide, the basic lead is combined with a large proportion of lead sulfate. Sublimed white lead usually contains not more than approximately thirty per cent basic lead expressed as PbO. Therefore, of the total weight of sublimed white lead used, less than a third is in a form which can react with the vehicle oils to produce lead-oil soaps.

Commercial leaded zinc oxides contain various amounts of basic lead sulfate, but the basic lead present is tied up with a large proportion of lead sulfate, so that even a thirty-five per cent leaded zinc oxide contains only from two to seven per cent basic lead, expressed as PbO. Accordingly, neither leaded zinc oxide nor sublimed white lead is a satisfactory source of basic lead in paints in which large amounts of either material are not desired.

It is convenient to indicate the basicity of a basic lead sulfate as a molecular ratio of lead oxide to lead sulfate, expressed $PbO:PbSO_4$. The basicity increases with the ratio, products of higher basicity containing higher percentages of combined PbO. The ratio of sublimed white lead, for instance, is about 0.6:1, indicating that the product is probably a mixture of compounds having the empirical formulas $PbO \cdot 2PbSO_4$ and $PbO \cdot PbSO_4$.

I have found that the properties of drying oil vehicle paints may be substantially improved by the introduction of basic lead in the form of basic lead sulfates having a $PbO:PbSO_4$ ratio no lower than about 2:1. Basic lead in this form is particularly well suited for reaction with the oil vehicle to give desirable lead soaps, and produces such beneficial changes in the properties of the paint as increased consistency before application and improved durability of the film after application.

The remarkable improvement effected in the properties of a paint by the addition of small amounts of a high ratio basic lead sulfate according to my present invention does not occur if a product of low ratio is used in place of the high ratio material. As has been pointed out above, low ratio basic lead sulfates have heretofore been used in paints primarily because of their pigment value and have therefore usually represented a large proportion of the total pigment of such paints.

The theoretical explanation of the greater reactivity of the basic lead in high ratio sulfates appears to be that the basic lead is more loosely combined in the high ratio products and that this loose combination does not occur in products of low ratio. The basic lead in high ratio basic sulfates is not present as free lead oxide, but is combined in the form of definite chemical compounds.

The discoloration of white paints encountered when litharge or red lead are used as a source of basic lead is avoided by the use of high ratio basic lead sulfates, which may be readily prepared in a pure white form having excellent covering power and other pigment properties.

The high ratio basic lead sulfates used according to this invention may be prepared by adaptation of the process known for the production of low ratio basic lead sulfates. Preferably the basic lead sulfates should be prepared by the processes described in my co-pending application, Serial Number 147,481 filed concurrently.

The addition of small quantities of high ratio basic lead sulfates to a paint causes an increase in the paint consistency. This consistency increase becomes more pronounced when the paint is permitted to age for a short period before application. When the consistency increase is caused by the addition of basic lead compounds, it may conveniently be used as a measure of the amount of lead-oil aggregate formation, and also as a measure of the improvement which may be expected in the paint durability.

The consistencies of paints may be measured on a comparative basis by means of a modified Stormer viscosimeter. In this modified apparatus two vertical blades attached to a cross-bar of a shaft revolve in a cup of the paint under test. Around a drum is wound a cord, one end of which is attached to a weight. The weight causes the cord to unwind from the drum, thus rotating the drum. By means of gears the rotation of the drum rotates the paddles in the paint. The weight required to cause one hundred revolutions of the paddle in thirty seconds in the particular paint being tested is determined experimentally.

A convenient numerical expression of relative consistencies is obtained by plotting a curve on rectilinear co-ordinates, using as abscissas the weights required to rotate the paddle of the modified Stormer viscosimeter one hundred times in thirty seconds, and as ordinates, numbers from 0 to 6, representing paint consistencies of increasing thickness, an ordinate of three indicating a medium consistency paint. The ordinate on such a curve thus furnishes a consistency rating of the paint.

The following tabulation shows data from which the consistency curve was plotted for the modified Stormer viscosimeter which I used in evaluating the consistencies of the improved paint formulations of my invention:

| Consistency rating of paint | Grams weight required to cause 100 rev. of paddles in 30 sec. |
|---|---|
| 1 | 190 |
| 2 | 245 |
| 3 | 335 |
| 4 | 475 |
| 5 | 600 |
| 6 | 700 |

The modified Stormer viscosimeter was used in the following manner to determine the consistencies of my improved paints.

The paint to be tested was poured into the cup of the Stormer apparatus up to a pre-determined level, the paddle thus being partially submerged. The paddle was caused to rotate by the falling weight and the time required for one hundred revolutions was noted. If this time was more than thirty seconds, the magnitude of the actuating weight was increased; if the time was less than thirty seconds, the weight was decreased. The test was repeated until a weight was found which caused one hundred revolutions of the paddle in 30 seconds. A point was found on the above described consistency curve corresponding to the abscissa representing this weight. The ordinate at this point was taken as the consistency rating of the paint.

The effect on the consistency of paints which results from the addition of high ratio basic lead sulfates according to my present invention is illustrated by the following examples:

*Example I*

A paint was made up using the following constituents in the indicated weight percentages:

| | |
|---|---|
| Lithopone | 24.0 |
| 35% leaded zinc oxide | 26.5 |
| Asbestine (filler) | 9.0 |
| Linseed oil (acid no.=5) | 29.5 |
| Bodied linseed oil | 2.6 |
| Drier | 1.7 |
| Mineral spirits | 6.1 |
| High ratio basic lead sulfate (Ratio 2PbO:PbSO$_4$) | 0.6 |

This paint was allowed to age for twenty days in a closed can to permit reaction of the basic lead sulfate with the vehicle. The consistency of the paint was then determined with the modified Stormer viscosimeter by the test described above. A consistency rating of 3.4 was obtained. A paint was made up with the same constituents in the same proportions except omitting the basic lead sulfate, PbSO$_4$·2PbO. After twenty days storage this paint had a consistency rating of 2.0. Thus a consistency increase of 1.4 points was effected by the addition of the high ratio basic lead sulfate according to my present invention.

*Example II*

Another paint typical of the compositions of my invention was made up using the following constituents in the indicated weight percentages:

| | |
|---|---|
| Lithopone | 24.0 |
| 35% leaded zinc oxide | 26.5 |
| Asbestine (filler) | 9.0 |
| Linseed oil (acid no.=5) | 29.5 |
| Bodied linseed oil | 2.6 |
| Drier | 1.7 |
| Mineral spirits | 6.1 |
| High ratio basic lead sulfate (Ratio 4PbO:PbSO$_4$) | 0.6 |

The consistency of this paint after aging twenty days was found to be 3.2. A paint, made up with the same constituents in the same proportions except omitting the high ratio basic sulfate, had a consistency after twenty days of 2.0. The paint embodying my present invention thus showed a consistency increase of 1.2 points over a paint of similar composition containing no high ratio basic sulfate.

*Example III*

A paint, having a pigment composition differing from Examples I and II, and further illustrating my invention, was made up using the following constituents in the indicated weight percentages:

| | |
|---|---|
| Lithopone | 49.0 |
| Asbestine (filler) | 10.4 |
| Linseed oil (acid no.=5) | 27.8 |
| Bodied linseed oil | 2.6 |
| Drier | 1.0 |
| Mineral spirits | 8.6 |
| High ratio basic lead sulfate (Ratio 2PbO:PbSO$_4$) | 0.6 |

The consistency of this paint after aging twenty days was found to be 3.8. A paint, made up with the same constituents in the same proportions except omitting the high ratio basic sulfate, had a consistency after twenty days of 2.2. The paint containing the high ratio basic sulfate according to my invention thus showed a consistency increase of 1.6 points.

It will, of course, be understood that the application of my invention is not limited to the particular formulations given in the above examples.

The beneficial effects of high ratio basic lead sulfates in paints may be obtained using any basic lead sulfate or mixture of basic sulfates having a ratio not substantially lower than about 2:1. In Examples I, II, and III I have shown the use of products having empirical ratios of $$2PbO:PbSO_4$$

and $4PbO:PbSO_4$. I have also obtained the advantages of my invention through the use of other high ratio basic lead sulfates such as a product having the empirical ratio $3PbO:PbSO_4$ and mixtures of products having various ratios.

The amounts of high ratio basic lead sulfates used to improve the properties of paints according to my invention may be widely varied. The proportions used in Examples I, II, and III gave paint compositions adapted conveniently to illustrate the advantages of the invention, but larger or smaller amounts may be used according to the magnitude of effect desired.

The beneficial effects of my novel high ratio basic sulfates may be obtained with other drying oils as well as linseed oil. In the example shown above linseed oil containing mineral spirits and a drier was used, but the invention is not limited to this particular vehicle. Also, pigments other than or in addition to the leaded zinc oxide and lithopone of the above example may be used without departing from the spirit of my invention.

I claim:

1. A paint containing a drying oil vehicle, the paint being modified by the presence of a basic lead sulfate having a $PbO:PbSO_4$ ratio not substantially lower than about 2:1 nor higher than about 4:1 whereby the paint after aging a few days has an increased consistency and improved durability.

2. A paint containing a drying oil vehicle, the paint being modified by the presence of a basic lead sulfate having an empirical $PbO:PbSO_4$ ratio of about 2:1 whereby the paint after aging a few days has an increased consistency and improved durability.

3. A paint containing a drying oil vehicle, the paint being modified by the presence of a basic lead sulfate having an empirical $PbO:PbSO_4$ ratio of about 3:1 whereby the paint after aging a few days has an increased consistency and improved durability.

4. A paint containing a drying oil vehicle, the paint being modified by the presence of a basic lead sulfate having an empirical $PbO:PbSO_4$ ratio of about 4:1 whereby the paint after aging a few days has an increased consistency and improved durability.

ROBERT PFANSTIEL.